Feb. 6, 1934.  C. M. TERRY  1,945,834
VALVE
Filed Aug. 25, 1931  2 Sheets-Sheet 2

INVENTOR
CHARLES M. TERRY
BY
Albert G. Blodgett
ATTORNEY

UNITED STATES PATENT OFFICE 1,945,834

VALVE

Charles M. Terry, Decatur, Ill., assignor to A. W. Cash Company, Decatur, Ill., a corporation of Delaware Application August 25, 1931. Serial No. 559,245

7 Claims. (Cl. 50—23)

This invention relates to valves, and more particularly to pressure reducing valves arranged to control automatically the pressure of the fluid discharged by the valve.

In order to overcome difficulties caused by wear and prolong the life of various parts such as the valve and valve seat in constructions of this type, it has heretofore been proposed to construct these parts of special alloys, many of which are very expensive. These alloys cannot ordinarily be cast with commercial success. Moreover they are frequently tough and difficult to machine, so that it is not possible to produce satisfactory screw threads with these materials. It is therefore very difficult to incorporate such materials in a pressure reducing valve which can be sold at a reasonable price.

It is accordingly one object of the invention to provide a pressure reducing valve which is so constructed that the wearable parts may be formed of tough wear resisting materials, and in which these parts are of such a shape that they may be readily produced from bar stock rather than castings, the use of screw threads being preferably avoided.

It is a further object of the invention to provide a pressure reducing valve which is so arranged that the valve and its seat may be readily removed as a unit for repair or replacement.

It is a further object of the invention to provide a pressure reducing valve of simple and inexpensive construction which will maintain a desired delivery pressure irrespective of flow variations, and which is so arranged that all internal parts are readily accessible for replacement, and yet most of the joints through which external leakage might occur are eliminated.

With these and other objects in view, the invention resides in the combination of parts set forth in the specification and covered by the claims appended hereto.

Figure 1:
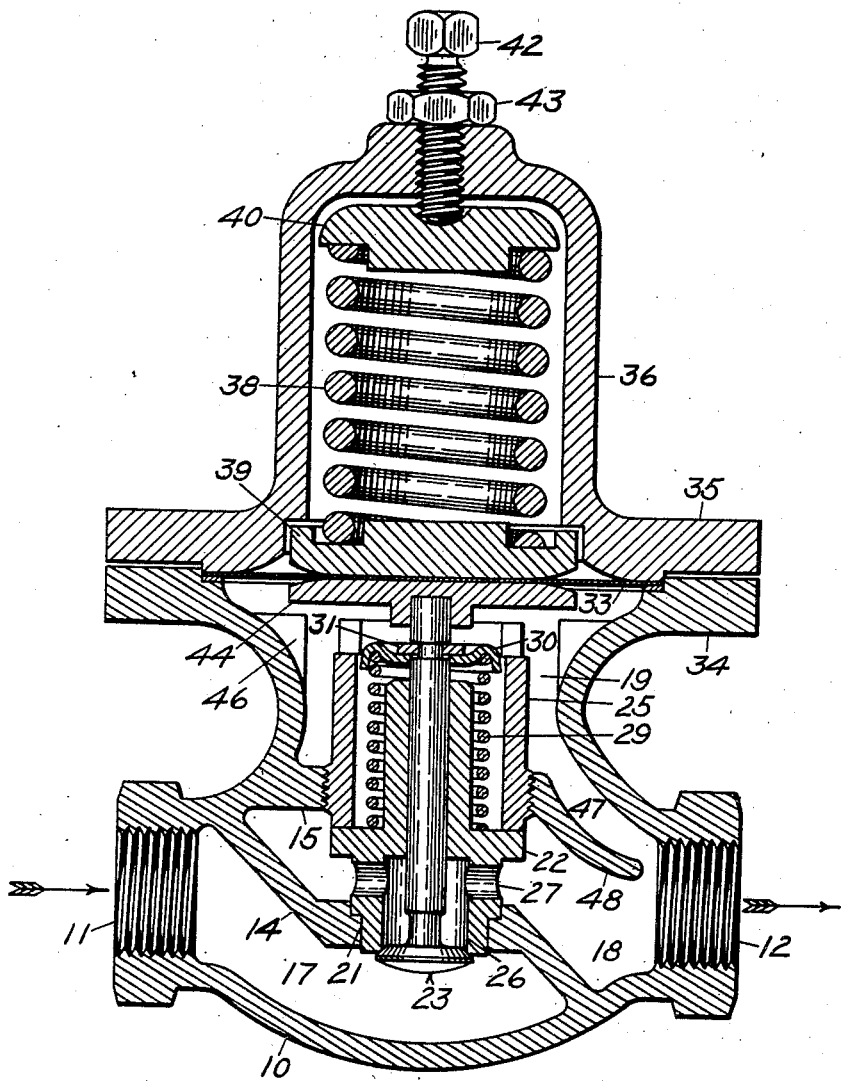
Figure 2:
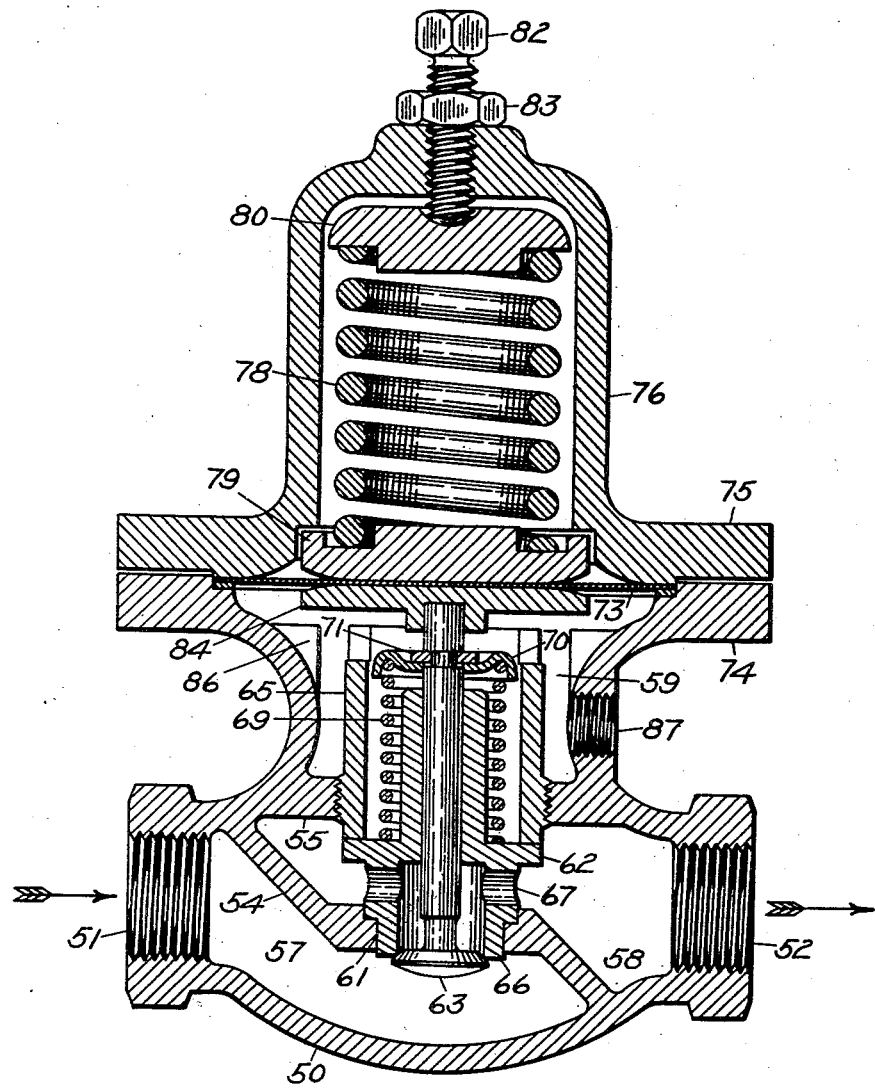

Referring to the drawings illustrating certain embodiments of the invention, in which like reference numerals indicate like parts, Fig. 1 is a section through the center of a pressure reducing valve; and Fig. 2 is a similar section through a somewhat modified construction.

The embodiment illustrated in Fig. 1 comprises a hollow casing 10 having an inlet opening 11 and an outlet opening 12 at opposite sides and in direct line with each other. The interior of the casing is divided by two partitions 14 and 15 into an inlet chamber 17 adjacent to the inlet 11, an outlet or delivery chamber 18 adjacent to the outlet 12, and a control chamber 19 located in the upper portion of the casing. The partition 14 is shaped as a Z extending diagonally across the casing, and it is provided with a central circular opening 21 which is preferably counterbored from above as shown.

In order to control the flow between the inlet 11 and the outlet 12, I provide a removable unitary structure comprising a valve cage 22 and a valve 23 mounted therein. This cage is shaped to fit the opening 21 and is held firmly in place therein by a cylindrical sleeve 25 screw threaded in the upper partition 15. The partition 14 forms a support for the valve cage, and the valve cage is clamped against this support by means of the sleeve 25. The valve 23 is of the poppet type, and its stem is slidable in the upper portion of the cage 22, which forms a guide-way. The lower end of the cage is recessed axially at 26 to provide a passageway for the fluid, and this recess 26 is intersected by lateral passages 27 leading to the outlet chamber 18. The lower portion of the cage surrounding the recess 26 forms an annular seat for the valve 23. The valve is urged upwardly toward its closed position by means of a comparatively light coiled compression spring 29 which surrounds the upper part of the cage 22 and contacts at its upper end with a spring button or washer 30. This button 30 is fastened to the valve stem by a key 31.

In order to control the movements of the valve 23 automatically, I provide a thin flexible diaphragm 33 which forms the upper wall of the control chamber 19. This diaphragm is clamped at its periphery between an annular flange 34 formed integral with the casing 10 and an annular flange 35 at the lower end of a hollow cylindrical spring casing 36. The casing 36 serves to enclose a heavy coiled compression spring 38 which urges the diaphragm 33 downwardly against the fluid pressure in the control chamber 19. A circular pressure plate 39 is preferably provided between the lower end of the spring 38 and the diaphragm, and the upper end of the spring is supported on a spring button 40 which may be adjusted vertically by means of a screw 42 threaded through the spring casing. A lock nut 43 prevents accidental movement of the screw. A circular plate 44 is preferably mounted on the upper end of the valve stem and contacts with the lower surface of the diaphragm. Abutment members 46 integral with the valve casing provide shoulders which limit the downward movement of the plate 44 and the valve 23.

In order that the valve 23 may be opened as the demand for fluid increases, I provide a port or passageway 47 through the upper partition wall 15, and this passageway preferably enters the delivery chamber 18 at an angle inclined toward the outlet opening 12. In the illustrated embodiment, this inclined passageway is formed between the sloping outer wall of the casing and an inclined lip or aspirating baffle 48, which is part of the partition 15. With this construction, under static conditions the pressure in chamber 19 is equal to that in chamber 18. If however there is a demand for fluid, and flow is taking place through the outlet 12, the pressure in chamber 19 will be less than the pressure in chamber 18, and the pressure difference will increase as the rate of flow increases. This is caused by the aspirating effect of the fluid flowing beneath the baffle 48 and through the outlet 12.

The operation of the embodiment illustrated in Fig. 1 will now be clear from the above disclosure. The inlet 11 is connected to a source of fluid under pressure, and the outlet 12 is connected to a fluid distributing system in which it is desired to maintain a substantially constant reduced pressure. Under no demand conditions, the fluid pressures in chambers 18 and 19 will be equal, and this pressure acting against the lower surface of the diaphragm 33 will keep the valve 23 closed against the force of spring 38. Demand for fluid will reduce the pressure in chambers 18 and 19, thus permitting the spring 38 to open the valve. The pressure in chamber 18 will therefore increase, and flow will take place from inlet chamber 17 through recess 26, lateral passages 27, delivery chamber 18, and outlet opening 12. The velocity of flow past the aspirating baffle 48 will still further reduce the pressure in control chamber 19, resulting in further valve opening, until the required pressure is restored in the delivery system. With this arrangement, a very small variation in the delivery line pressure will produce a greatly amplified variation in the control chamber pressure, because of the aspirating effect, and the result is the maintenance of a substantially constant pressure in the delivery system regardless of extreme variations in the demand for fluid. The construction is extremely simple and compact, and all unnecessary parts are eliminated.

Both the valve 23 and the cage 22 are of simple construction and can be readily machined from bar stock. They can therefore be made of special wear resisting alloys which cannot be cast successfully. Neither of these parts has any screw threads which would be difficult to form from tough materials. The valve casing 10 and the clamping sleeve 25 can of course be made of comparatively cheap cast material. The valve cage and valve can be readily removed as a unit for repair or replacement. The cage provides both the valve seat and the valve guideway in a single integral member, so that the problem of obtaining accurate alignment is greatly simplified. By simply removing the spring casing 36, it is possible to obtain access to all internal parts. The joint between the spring casing and the valve body 10 is the only joint through which external leakage can possibly occur. The entire construction is simple and inexpensive to manufacture, and thoroughly dependable in operation.

In Fig. 2 of the drawings I have illustrated a modified form of the invention. This embodiment is identical with that in Fig. 1 except that it has been arranged for remote control of the pressure in the control chamber.

The embodiment illustrated in Fig. 2 comprises a casing 50 having an inlet opening 51 and an outlet opening 52. Partitions 54 and 55 divide the interior of the casing into an inlet chamber 57, a delivery chamber 58, and a control chamber 59. Partition 54 is provided with a counterbored circular opening 61, and a valve cage 62 provided with a slidable poppet valve 63 is mounted in the opening and held in position by a cylindrical sleeve 65 screw threaded in the partition 55. The lower end of the cage is recessed axially at 66 to provide a flow passage and this recess is intersected by lateral passages 67 leading to the delivery chamber 58. A light spring 69 surrounds the upper part of the valve cage and contacts with a spring button 70 which is fastened to the valve stem by a key 71.

A thin flexible diaphragm 73 forms the upper wall of the control chamber 59, and this diaphragm is clamped at its periphery between an annular flange 74 on the casing 10 and an annular flange 75 at the lower end of a hollow spring casing 76. The casing 76 encloses a heavy spring 78 which forces a pressure plate 79 downwardly against the upper surface of the diaphragm. The upper end of the spring is supported on a spring button 80 which may be adjusted vertically by means of a screw 82 and lock nut 83. A plate 84 is provided beneath the diaphragm and in contact with the upper end of the valve stem. Abutments 86 on the casing 50 limit the downward movement of the plate 84 and the valve.

It will now be seen that the partition 55 prevents any direct communication between the delivery chamber 58 and the control chamber 59. In order to transmit fluid pressure to the control chamber and thereby actuate the diaphragm, I provide an opening 87 in the wall of the casing 50. This opening leads directly into the control chamber, and may be screw threaded as shown to permit a control pipe to be connected thereto. For convenience in illustration, the opening 87 has been shown in the same vertical plane as the inlet opening 51 and the outlet opening 52. In actual practice this control pipe opening would ordinarily be provided in a plane located at 90 degrees from the plane of the inlet and outlet. However, it will be clear that the location of this opening has no effect on the operation of the device, provided that it communicates with the control chamber.

In operation the embodiment illustrated in Fig. 2 is connected to a fluid distributing system in the same way as that shown in Fig. 1, except that an additional pipe must be provided from the opening 87 to some remote part of the delivery system where it is desired to maintain a constant pressure. Whenever this control pressure decreases, the spring 78 will open the valve 63 and the resulting increased flow will restore the desired pressure.

The construction of the valve and cage, as well as the method of mounting these parts in the valve casing, are the same in both illustrated embodiments. The advantages of this arrangement have already been set forth.

Having thus described my invention, what I claim as new and desire to secure by Letters Patent is:

1. A pressure reducing valve comprising a hollow casing having an inlet and an outlet, a slidable valve arranged to control the flow between the inlet and the outlet, said casing having an opening, a flexible diaphragm closing the opening and connected to actuate the valve, a valve cage mounted within the casing and arranged to form a valve seat and a guideway for the valve, the casing having a portion shaped to form a support for the valve cage, and a sleeve screw threaded to the casing and serving to clamp the valve cage in place against the support, both the valve cage and the sleeve being removable through said opening after the diaphragm is removed.

2. A pressure reducing valve comprising a hollow casing having an inlet and an outlet, a partition extending across the interior of the casing between the inlet and the outlet, said partition having an opening therein, a valve cage mounted adjacent to the opening and on the discharge side of the partition, said cage providing a valve seat and a guideway, a valve cooperating with the seat and having a stem slidable in the guideway, a sleeve screw threaded to the casing and arranged to clamp the valve cage in place against the partition, and a flexible diaphragm exposed to fluid pressure and connected to the valve stem to actuate the valve.

3. A pressure reducing valve comprising a hollow casing having an inlet and an outlet, a slidable valve arranged to control the flow between the inlet and the outlet, said valve having a valve stem, a valve cage mounted within the casing and arranged to form a valve seat and a guideway for the valve, the casing having a portion shaped to form a support for the valve cage, a sleeve screw threaded to the casing and serving to clamp the valve cage in place against the support, and a flexible diaphragm subjected to fluid pressure, the valve stem extending through the sleeve, and the diaphragm being connected to the valve stem to actuate the valve.

4. A pressure reducing valve comprising a hollow casing having an inlet and an outlet, two partitions dividing the interior of the casing into an inlet chamber, an outlet chamber and a control chamber, a flexible diaphragm forming one wall of the control chamber, a slidable valve actuated by said diaphragm and arranged to control the flow from the inlet chamber to the outlet chamber, a valve cage mounted on one of said partitions and arranged to form a valve seat and a guideway for said valve, and a sleeve screw threaded to the other of said partitions and serving to hold the valve cage in place.

5. A pressure reducing valve comprising a hollow casing having an inlet and an outlet, two partitions dividing the interior of the casing into an inlet chamber, an outlet chamber and a control chamber, a flexible diaphragm forming one wall of the control chamber, a slidable poppet valve actuated by said diaphragm and arranged to control the flow from the inlet chamber to the outlet chamber, a valve cage mounted on one of said partitions and arranged to form a valve seat and a guideway for said valve, said cage having a recess at one end surrounded by the valve seat which communicates with the inlet chamber and lateral passages leading from said recess to the outlet chamber, and a cylindrical sleeve screw threaded to the other of said partitions and serving to hold the valve cage in place.

6. A pressure reducing valve comprising a hollow casing having an inlet and an outlet, a slidable poppet valve arranged to control the flow between the inlet and the outlet, a flexible diaphragm subjected to fluid pressure and connected to actuate the valve, a valve cage mounted within the casing, one end of the cage forming a guideway for the valve and the other end having an axial recess communicating with the inlet and surrounded by an annular valve seat, said cage also having a lateral passage providing communication between said recess and the outlet, a coiled compression spring surrounding the guideway portion of the cage, and a spring button connecting one end of said spring with the valve.

7. A pressure reducing valve comprising a hollow casing having an inlet and an outlet, a slidable poppet valve arranged to control the flow between the inlet and the outlet, a flexible diaphragm subjected to fluid pressure and connected to actuate the valve, a valve cage mounted within the casing, one end of the cage forming a guideway for the valve and the other end having an axial recess communicating with the inlet and surrounded by an annular valve seat, said cage also having a lateral passage providing communication between said recess and the outlet, a coiled compression spring surrounding the guideway portion of the cage, a spring button connecting one end of the spring with the valve, and a sleeve surrounding the spring, said sleeve being screw threaded to the casing and serving to hold the valve cage in place.

CHARLES M. TERRY.